United States Patent
Fujiwara et al.

(10) Patent No.: US 8,337,349 B2
(45) Date of Patent: Dec. 25, 2012

(54) POWER TRANSMISSION BELT

(75) Inventors: Katsuyoshi Fujiwara, Kobe (JP); Yoshiyuki Kitano, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 1023 days.

(21) Appl. No.: 11/630,614

(22) PCT Filed: Jun. 21, 2005

(86) PCT No.: PCT/JP2005/011702
§ 371 (c)(1),
(2), (4) Date: Dec. 22, 2006

(87) PCT Pub. No.: WO2006/001408
PCT Pub. Date: Jan. 5, 2006

(65) Prior Publication Data
US 2009/0186733 A1 Jul. 23, 2009

(30) Foreign Application Priority Data
Jun. 23, 2004 (JP) ................... 2004-185616

(51) Int. Cl.
*F16G 1/00* (2006.01)
*F16G 5/00* (2006.01)
*F16G 9/00* (2006.01)

(52) U.S. Cl. ....................... 474/264; 474/263

(58) Field of Classification Search ............ 474/264, 474/263
See application file for complete search history.

(56) References Cited

U.S. PATENT DOCUMENTS

| | | | | |
|---|---|---|---|---|
| 3,658,732 A * | 4/1972 | Ballini et al. | ............. | 525/192 |
| 4,201,698 A * | 5/1980 | Itoh et al. | .......... | 524/83 |
| 4,244,234 A * | 1/1981 | Standley | ............ | 474/263 |
| 4,522,614 A * | 6/1985 | Matsuoka et al. | ......... | 474/260 |
| 4,614,779 A * | 9/1986 | Watanabe et al. | ......... | 525/199 |
| 4,642,082 A * | 2/1987 | Mashimo et al. | ......... | 474/260 |
| 4,942,202 A * | 7/1990 | Zama et al. | ............. | 525/104 |
| 4,968,753 A * | 11/1990 | Oyama et al. | ............. | 525/274 |
| 5,010,137 A * | 4/1991 | Umeda et al. | ............. | 525/104 |
| 5,118,773 A * | 6/1992 | Takao et al. | ............. | 526/282 |
| 5,179,156 A * | 1/1993 | Takao et al. | ............. | 524/518 |
| 5,413,538 A * | 5/1995 | Mishima | ............ | 474/263 |
| 5,430,117 A * | 7/1995 | Kawasaki et al. | ......... | 526/336 |
| 5,470,919 A * | 11/1995 | Tojo et al. | ............. | 525/334.1 |
| 5,501,643 A * | 3/1996 | Isshiki et al. | ............. | 474/268 |

(Continued)

FOREIGN PATENT DOCUMENTS

JP 5-262919 A 10/1993

(Continued)

*Primary Examiner* — Michael Mansen
*Assistant Examiner* — Henry Liu
(74) *Attorney, Agent, or Firm* — Hamre, Schumann, Mueller & Larson, P.C.

(57) ABSTRACT

The invention provides a power transmission belt which is superior in oil resistance so that it is swollen to only a reduced degree, reduced in hardness, and small in abrasion if the rubber layers are stained with oil while the belt is being used in an oil-present environment. Such a power transmission belt has rubber layers which comprise a compression rubber layer and an adhesion rubber layer both of which are vulcanized and bonded to each other and load carrying cords are embedded in the adhesion rubber layer, wherein at least the compression rubber layer between the two rubber layers is formed of vulcanizate obtained by vulcanizing ethylene-α-olefin-diene rubber with an organic peroxide and a trifunctional co-crosslinking agent.

3 Claims, 1 Drawing Sheet

U.S. PATENT DOCUMENTS

| | | | |
|---|---|---|---|
| 5,584,771 A * | 12/1996 | Isshiki et al. | 474/264 |
| 5,599,246 A * | 2/1997 | Fujiwara et al. | 474/205 |
| 5,696,214 A * | 12/1997 | Sagane et al. | 526/170 |
| 5,807,948 A * | 9/1998 | Sagane et al. | 526/336 |
| 5,922,823 A * | 7/1999 | Sagane et al. | 526/336 |
| 6,251,977 B1 | 6/2001 | Georget et al. | |
| 6,294,600 B1 * | 9/2001 | Takada et al. | 524/105 |
| 6,303,727 B1 * | 10/2001 | Maeda et al. | 526/335 |
| 6,524,417 B2 * | 2/2003 | Hasaka et al. | 156/137 |
| 6,595,883 B1 * | 7/2003 | Breed et al. | 474/263 |
| 6,607,828 B1 * | 8/2003 | Hasaka | 428/369 |
| 6,632,541 B2 * | 10/2003 | Johoji et al. | 428/474.4 |
| 6,764,422 B2 * | 7/2004 | Hasaka et al. | 474/263 |
| 6,875,144 B2 * | 4/2005 | Kinoshita et al. | 474/260 |
| 7,232,862 B2 * | 6/2007 | Odagawa et al. | 525/70 |
| 7,485,060 B2 * | 2/2009 | Hineno et al. | 474/263 |
| 2001/0031816 A1 * | 10/2001 | Nakano | 524/433 |
| 2001/0034282 A1 * | 10/2001 | Hasaka et al. | 474/260 |
| 2003/0180516 A1 * | 9/2003 | Hasaka et al. | 428/295.1 |
| 2004/0176540 A1 * | 9/2004 | Nishihara | 525/192 |
| 2005/0037882 A1 * | 2/2005 | Hineno et al. | 474/263 |

FOREIGN PATENT DOCUMENTS

| | | |
|---|---|---|
| JP | 9-500930 A | 1/1997 |
| JP | 2000-26674 A | 1/2000 |
| JP | 2000-297847 A | 10/2000 |
| JP | 2002-81506 A | 3/2002 |
| JP | 2002-195349 A | 7/2002 |
| JP | 2002-225149 A | 8/2002 |
| JP | 2003-130137 A | 5/2003 |
| JP | 2003-240055 A | 8/2003 |
| WO | WO 96/13544 A1 | 5/1996 |

* cited by examiner

POWER TRANSMISSION BELT

FIELD OF THE INVENTION

The invention relates to a power transmission belt that has rubber layers formed of vulcanizate of ethylene-α-olefin-diene rubber superior in oil resistance as well as in resistance to abrasion while it is running.

DESCRIPTION OF PRIOR ART

In general, a power transmission belt has a compression rubber layer and an adhesion rubber layer, and load carrying cords formed of fibers are embedded in and bonded to the adhesion rubber layer. If necessary, a sheet of rubberized canvas is bonded to an upper face, a lower face or all the faces including the side faces of the belt.

A compression rubber layer of such a power transmission belt has conventionally been formed of chloroprene rubber in many cases. However, in recent years, there is a remarkably increasing demand for heat resistance as well as cold resistance of a power transmission belt and, on the other hand, from the viewpoint of environmental protection or being free from chlorine, ethylene-α-olefin-diene rubber superior in heat resistance and cold resistance is tried to be used as a material rubber for a power transmission belt, as described in, for example, JP 2002-195349A, JP 2000-297847A, JP 2003-130137A, JP 2002-81506A, JP 09-500930A, etc.

However, as already well known, ethylene-α-olefin-diene rubber has a small polarity in the molecular structure and it has a good compatibility with nonpolar oil, and hence it is inferior in oil resistance. Accordingly, ethylene-α-olefin-diene rubber has almost not been used in an oil-present environment. For example, when a rubber layer of a V-ribbed belt formed of vulcanizate of ethylene-α-olefin-diene rubber is stained with oil, the belt is swollen and it is feared that it is finally damaged.

In general, some methods to improve oil resistance of rubber have been known. For example, a method in which a large quantity of fillers is incorporated in rubber to reduce the relative amount of the rubber is known. A further method in which the molecular weight of polymer molecules that form rubber is increased to maintain the strength of the rubber if it is stained with oil is known. A still further method in which, when polymer molecules that form rubber contain ethylene units, the ethylene units are increased to provide crystallinity with the polymer molecules is also known.

However, since the first method causes deterioration of strength of rubber, it is difficult to employ the method in such a field wherein high dynamic stress is applied as a power transmission belt. The second and the third methods cause deterioration of processability of rubber and it is difficult to employ these methods in industrial fields.

Therefore, the invention has been completed to solve the problems involved in a power transmission belt in which the rubber layers of the belt are to be formed of ethylene-α-olefin-diene rubber. It is an object of the invention to provide a power transmission belt which has rubber layers formed of vulcanizate of ethylene-α-olefin-diene rubber superior in oil resistance so that it is swollen to a reduced degree and it is also reduced in hardness if the rubber layers are stained with oil while the belt is being used in an oil-present environment, but also which is reduced in abrasion while it is running.

SUMMARY OF THE INVENTION

The invention provides a power transmission belt which has rubber layers wherein the rubber component of the rubber layers comprises not less than 50% by weight of vulcanizate of ethylene-α-olefin-diene rubber obtained by vulcanizing ethylene-α-olefin-diene rubber with an organic peroxide and a trifunctional co-crosslinking agent.

According to a preferred embodiment of the invention, the rubber layers comprise a compression rubber layer and an adhesive rubber both of which are vulcanized and bonded to each other, and the adhesion rubber layer has a plurality of load carrying cords embedded therein, wherein at least the compression rubber layer between the two rubber layers is formed of vulcanizate of ethylene-α-olefin-diene rubber obtained by vulcanizing ethylene-α-olefin-diene rubber with an organic peroxide and a trifunctional co-crosslinking agent.

DESCRIPTION OF PREFERRED EMBODIMENTS OF THE INVENTION

The power transmission belt of the invention has rubber layers of which rubber component comprises not less than 50% by weight of vulcanizate of ethylene-α-olefin-diene rubber. It is preferred that the power transmission belt of the invention has rubber layers comprising a compression rubber layer and an adhesion rubber layer both of which are vulcanized and bonded to each other, and a plurality of load carrying cords are embedded in and bonded to the adhesion rubber layer, and if necessary, the upper face, or the lower face, or all the faces including the side faces of the belt have rubberized canvas bonded thereto, wherein the rubber component of the rubber layers comprise not less than 50% by weight of vulcanizate of ethylene-α-olefin-diene rubber.

In particular, the power transmission belt of the invention has a compression rubber layer and an adhesion rubber layer both of which are vulcanized and bonded to each other, and a plurality of load carrying cords are embedded in and bonded to the adhesion rubber layer, and if necessary, the upper face, or the lower face, or all the faces including the side faces of the belt have rubberized canvas bonded thereto, wherein at least the compression rubber layer is formed of vulcanizate of ethylene-α-olefin-diene rubber, and most preferably both the compression rubber layer and the adhesion rubber layer are formed of vulcanizate of ethylene-α-olefin-diene rubber.

According to the invention, at least the compression rubber layer is formed of vulcanizate of ethylene-α-olefin-diene rubber obtained by vulcanizing ethylene-α-olefin-diene rubber with an organic peroxide and a trifunctional co-crosslinking agent. The adhesion rubber layer may also be formed of vulcanizate of ethylene-α-olefin-diene rubber obtained by vulcanizing ethylene-α-olefin-diene rubber with an organic peroxide and a trifunctional co-crosslinking agent in the same manner as the compression rubber layer, or it may be formed of vulcanizate obtained by vulcanizing ethylene-α-olefin-diene rubber with sulfur.

Figure 1:
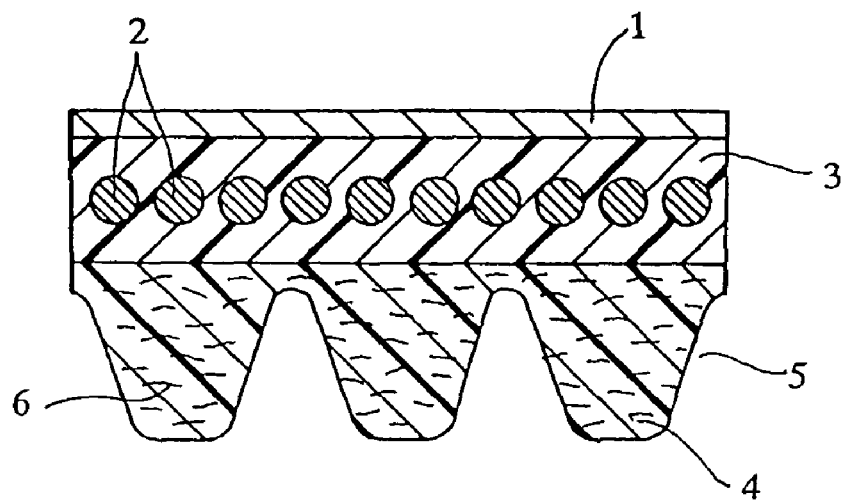
FIG. 1 is a cross-section of an example of a V-ribbed belt.

The power transmission belt includes herein the invention V-ribbed belts and V-belts. FIG. 1 shows a cross section of a V-ribbed belt as an example of the power transmission belt of the invention. The belt has an upper face covered with one or more sheets of rubberized reinforcing fabric or canvas 1. In adjacent to the upper face, the belt has an adhesion rubber layer 3 in which a plurality of polyester or aramid fiber cords 2 of low elongation are embedded, laterally apart from each other and extending in the longitudinal direction of the belt. In turn, a compression rubber layer 5 that has a plurality of ribs 4 is laminated on the adhesion rubber layer. The ribs are laterally apart from each other and extend in the longitudinal direction of the belt. In many cases, the compression rubber layer has short fibers dispersed therein which are oriented in the widthwise direction of the belt so that the belt has improved resistance to lateral pressure.

Figure 2:
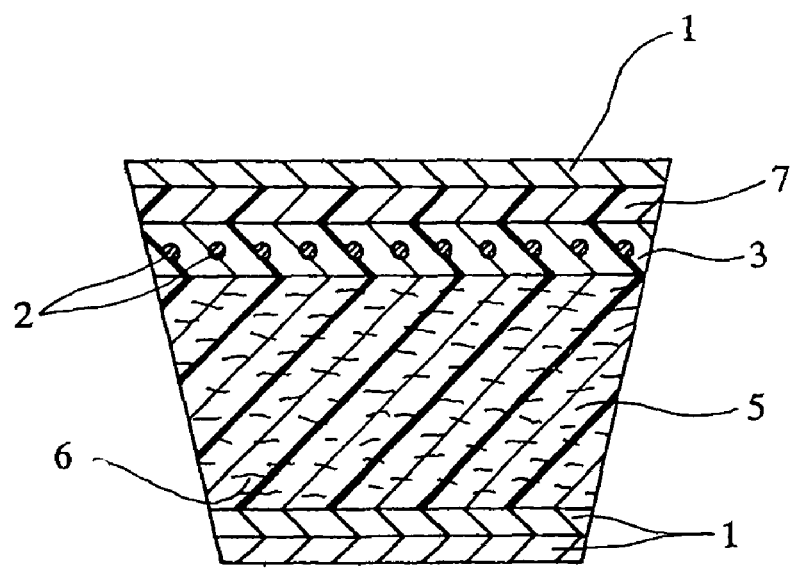
FIG. 2 is a cross-section of an example of a V-belt.

FIG. 2 shows a cross section of a V-belt as an example of the power transmission belt of the invention. In the same manner as the above-mentioned V-ribbed belt, the V-belt has an upper face covered with one or more sheets of rubberized reinforcing fabric or canvas 1. Optionally, the belt has a tension layer 7 under the reinforcing fabric laminated thereto. In adjacent to the tension layer, the belt has an adhesion rubber layer 3 in which a plurality of load carrying cords 2 are embedded. A compression rubber layer 5 is laminated on the adhesion rubber layer. In many cases, the compression rubber layer has short fibers 6 dispersed therein that are oriented in the widthwise direction of the belt so that the compression rubber layer has improved resistance to lateral pressure. The compression rubber layer is usually covered with one or more sheets of rubberized reinforcing fabric or canvas 1.

The short fibers dispersed in the compression rubber layer and oriented in the widthwise direction of the conventional power transmission belt are 2-6 deniers and 1-5 mm long, and are adhesion-treated before they are used. The adhesion-treated short fibers are obtained, for example, by impregnating bundles of filaments of fibers with RFL (resorcin-formalin-latex), heating and drying, and then cutting to an appropriate length. The short fibers adhesion-treated in this way are dispersed and oriented in the widthwise direction of the belt and they are bonded to the compression rubber. Accordingly, it is difficult that the compression rubber layer of the belt secures elongation in the grain direction.

In contrast, according to the invention, it is preferred that short fibers used in a compression rubber layer are such that they have not been adhesion-treated. In the case such short fibers are dispersed in a compression rubber layer so that they are oriented in the widthwise direction of the belt, there is no adhesion formed between the short fibers and the rubber. As results, there is caused slip at the interface of short fibers and the rubber when the compression rubber layer is elongated, but after the slip has occurred in this way, the rubber can be elongated until it is broken on account of elasticity of rubber itself. Thus, the compression rubber layer secures a long elongation in the grain direction, or the direction in which the short fibers are oriented.

According to the invention, the short fibers that have not been adhesion-treated are used in an amount of 5-30 parts by weight, preferably in an amount of 10-25 parts by weight, in relation to 100 parts by weight of ethylene-α-olefin-diene rubber to form a compression rubber layer. Further according to the invention, a part of the short fibers that have not been adhesion-treated may be replaced by short fibers that have been adhesion-treated. In this case, both of the short fibers that have not been adhesion-treated and the short fibers that have been adhesion-treated are used in total in an amount of 5-30 parts by weight in relation to 100 parts by weight of ethylene-α-olefin-diene rubber and the amount of the short fibers that have been adhesion-treated is preferably not more than 25% by weight, more preferably in the range of 5-25% by weight based on the total of the short fibers. According to the invention, the short fibers that have not been adhesion-treated are dispersed in a compression rubber layer so that they are oriented in the widthwise direction of the belt in this way, thus enabling to improve the resistance of compression rubber layer to lateral pressure and to secure a large elongation of the compression rubber layer in the grain direction.

The ethylene-α-olefin-diene rubber used in the invention is a copolymer rubber formed of ethylene, an α-olefin except ethylene and a diene (non-conjugated diene), or a partially halogen substituted product of the rubber or a mixture of these. The α-olefin is preferably at least one of propylene, butene, hexene and octene. Preferred ethylene-α-olefin-diene rubber used in the invention is ethylene-propylene-diene rubber or a partially halogen substituted product of the rubber, especially a partially chlorine substituted product of the rubber, or a mixture of these. The diene component used includes non-conjugated dienes such as 1,4-hexadiene, dicyclopentadiene or ethylidene norbornene, although the diene component usable is not limited thereto.

The ethylene-α-olefin-diene rubber is mixed uniformly with a reinforcement such as carbon black or silica, a vulcanizing agent such as sulfur, various vulcanization accelerating agents, a promotion activator such as zinc oxide or stearic acid, a softener (plasticizer) such as paraffin oil, a tackifier, etc. using a common mixing means such as rolls or Bumbery's mixer, thereby preparing an unvulcanized rubber compound. The unvulcanized rubber compound is then formed to an unvulcanized rubber compound sheet to be used to form a compression rubber layer or an adhesion rubber layer in the production of a power transmission belt.

The ethylene-α-olefin-diene rubber compound may further contain a reinforcement such as glass fibers or ceramic fibers, a filler such as calcium carbonate or talc, and various chemicals commonly used in rubber industry such as a stabilizer, a processing aid or a coloring agent, if necessary, in addition to the above-mentioned rubber chemicals. The adhesive solution (so-called rubber cement) mentioned hereinafter is prepared usually by dissolving such an unvulcanized ethylene-α-olefin-diene rubber compound as mentioned above in an organic solvent.

The power transmission belt of the invention has a compression rubber layer and an adhesion rubber layer as mentioned above which are vulcanized and bonded to each other, and a plurality of adhesion-treated load carrying cords are embedded in and bonded to the adhesion rubber layer. The load carrying cords are usually formed of polyester fibers or aramid fibers, although the cords are not specifically limited thereto.

Further according to the invention, it is preferred that at least the compression rubber layer between the compression rubber layer and the adhesion rubber layer is formed of a vulcanizate of ethylene-α-olefin-diene rubber, and it is more preferred that both the compression rubber layer and the adhesion rubber layer are formed of vulcanizate of ethylene-α-olefin-diene rubber. According to the invention, at least the compression rubber layer is formed of vulcanizate of ethylene-α-olefin-diene rubber obtained using an organic peroxide and a trifunctional co-crosslinking agent.

The organic peroxide used is not specifically limited, and any organic peroxide is usable so far as it is capable of vulcanizing an ethylene-α-olefin-diene rubber. Some examples of the organic peroxides used include, for example, dicumyl peroxide, 2,5-dimethyl-2,5-di(t-butylperoxy)hexane, 2,5-dimethyl-2,5-di(t-butylperoxy)hexyne-3,2,5-dimethyl-2,5-di(benzoylperoxy)hexane, among others. The organic peroxide is used usually in an amount of 0.005-0.05 moles, preferably in an amount of 0.01-0.04 moles, in relation to 100 parts by weight of ethylene-α-olefin-diene rubber used.

The rubber layers of the power transmission belt of the invention, preferably both the compression rubber layer and the adhesion rubber layer, are formed of vulcanizate of ethylene-α-olefin-diene rubber, and at least the compression rubber layer is formed of vulcanizate of ethylene-α-olefin-diene rubber obtained using such an organic peroxide as mentioned above and a trifunctional co-crosslinking agent.

The co-crosslinking agent used preferably includes, for example, trimethylolpropane triacrylate, trimethylolpropane trimethacrylate and triallyl isocyanurate, among others, and trimethylolpropane triacrylate or trimethylolpropane trimethacrylate is used preferably. The co-crosslinking agent is used in an amount of 0.1-10 parts by weight, preferably in an amount of 1-5 parts by weight, in relation to 100 parts by weight of the ethylene-α-olefin-diene rubber used.

As described above, according to the invention, at least the compression rubber layer is formed of vulcanizate obtained by vulcanizing an ethylene-α-olefin-diene rubber using an organic peroxide and a trifunctional co-crosslinking agent. In other words, an ethylene-α-olefin-diene rubber is vulcanized with an organic peroxide and has crosslinking points of three dimensional structure formed with a trifunctional co-crosslinking agent. This is the reason why if the vulcanizate of ethylene-α-olefin-diene rubber of which the compression rubber layer of the power transmission belt is formed is stained with oil in an oil-present environment, the vulcanizate is suppressed in swelling and change in hardness, and hence the vulcanizate is superior in oil resistance, but also it is improved in abrasion while it is running. Thus, the power transmission belt of the invention can be used practically in an oil-present environment.

When a trifunctional co-crosslinking agent is used in an amount of more than 10 parts by weight in relation to 100 parts by weight of ethylene-α-olefin-diene rubber used, crosslinking points are formed in excess, resulting in remarkable deterioration of resistance to flexural fatigue. On the other hand, when a trifunctional co-crosslinking agent is used in an amount of less than 1 part by weight in relation to 100 parts by weight of ethylene-α-olefin-diene rubber used, the resulting vulcanizate has only a small number of three dimensional crosslinking points, failing to provide improved oil resistance with the ethylene-α-olefin-diene rubber vulcanizate, and also to reduce abrasion while the belt is running.

On the other hand, when a power transmission belt has a compression rubber layer which is formed of vulcanizate of ethylene-α-olefin-diene rubber obtained using sulfur as a vulcanizing agent, such a vulcanizate has an insufficient resistance to swelling when it is stained with oil so that it swells easily, and it suffers abrasion but also change in hardness to a great degree. When a difunctional co-crosslinking agent is used, the resulting rubber layer is improved in oil resistance to some extent as compared with a rubber layer formed of vulcanizate using sulfur as a vulcanizing agent, however, the resulting crosslinking points have not a three dimensional structure and as consequence, the resulting rubber layer has only insufficient oil resistance. Abrasion of belt while it is running is not reduced.

However, according to the invention, when an ethylene-α-olefin-diene rubber is vulcanized using an organic peroxide and a trifunctional co-crosslinking agent as stated above, sulfur may be used together as a vulcanizing agent. In this case, it is preferred that a vulcanization accelerator is used in combination with sulfur. The vulcanization accelerator used is not specifically limited, but it includes, for example, thiurams such as tetramethylthiuram disulfide and thiazoles such as 2-mercaptobenzothiazole.

The power transmission belt of the invention can be produced by a commonly known method. By way of example, a V-ribbed belt is produced as follows. One or more sheets of rubberized canvas and a first unvulcanized rubber sheet to form an adhesion rubber layer are wound on the smooth surface of a molding cylinder, and then load carrying cords which have been adhesion-treated as mentioned above are wound spirally thereon. A second unvulcanized rubber sheet to form an adhesion rubber layer is wound on the first rubber sheet. An unvulcanized rubber sheet to form a compression rubber layer is then wound on the second unvulcanized rubber sheet, thereby preparing a laminate.

The laminate is then heated under pressure in a vulcanizing vessel to effect vulcanization of the rubber sheets to provide a annular vulcanizate product. The annular vulcanizate product is installed on a first belt driving system comprised of a driving pulley and a driven pulley and is driven to run under a predetermined tension while a plurality of ribs are formed on the surface of the laminate with a suitable grinding wheel. The annular product having the ribs thereon is then installed on a second belt driving system and is driven to run while it is cut in round slices having a predetermined width thereby providing V-ribbed belts.

INDUSTRIAL AVAILABILITY OF THE INVENTION

A vulcanizate obtained by vulcanizing an ethylene-α-olefin-diene rubber, preferably an ethylene-propylene-diene rubber, using an organic peroxide and a trifunctional co-crosslinking agent is swollen to a reduced degree and suffers only reduced change in hardness if the vulcanizate is stained with oil. Furthermore, the power transmission belt of the invention which has an adhesion rubber layer and a compression rubber layer and at least the compression rubber between the rubber layers is formed of vulcanizate obtained by vulcanizing an ethylene-α-olefin-diene rubber using an organic peroxide and a trifunctional co-crosslinking agent is suppressed in abrasion while it is running. In this way, the invention provides a power transmission belt which is superior in oil resistance and is reduced in abrasion while it is running, and hence which can be practically used in an oil present environment.

Further according to the invention, when the compression rubber layer has short fibers that have not been adhesion-treated dispersed therein and oriented in the widthwise direction of the belt, the compression rubber layer is improved in resistance to lateral pressure and has a large elongation in the grain direction of the compression rubber layer.

EXAMPLES

The invention will be described in more detail with reference to examples below, but the invention is not limited thereto.

A rubber compound having the following composition by parts by weight was used as a compound to prepare an adhesion rubber layer of power transmission belt.

| | |
|---|---|
| Ethylene-propylene-diene rubber[1] | 100 |
| Stearic acid | 1 |
| Zinc oxide | 5 |
| FEF Carbon | 65 |
| Silica | 21 |
| Paraffin oil | 15 |
| Processing aid | 7 |
| Vulcanizing agent (sulfur) | 3 |
| Vulcanization accelerator | 2.5 |

Note
[1] EP38 available from JSR K.K.

A rubber compound having the following composition by parts by weight was used as a compound to prepare a compression rubber layer of power transmission belt. Short fibers A which had not been adhesion-treated were used in Examples 1-8 while short fibers A which had been adhesion-treated were used in Comparative Examples 1-9. Short fibers B which had been adhesion-treated were used in all the Examples and Comparative Examples.

| | |
|---|---|
| Ethylene-propylene-diene rubber[1] | 100 |
| Stearic acid | 0.25 |
| Zinc oxide | 5 |
| FEF Carbon | 60 |
| Paraffin oil | 10 |
| Short fibers A (66 Nylon, 3 de × 1 mm, with or without adhesion-treatment) | (Table 1) |
| Short fibers B (aramid, 1.5 de × 3 mm, with adhesion-treatment) | 4 |
| Crosslinking agent | (Table 1) |
| Co-crosslinking agent | (Table 1) |

Note
[1]Esprene 301 available from Sumitomo Kagaku Kogyo K.K.

Examples 1 to 8

(Preparation of ethylene-propylene-diene rubber vulcanizate)

The ethylene-propylene-diene rubber compound to form a compression rubber layer was heated at a temperature of 175° C. for 15 minutes under pressure in the presence of an organic peroxide and a co-crosslinking agent to prepare an ethylene-propylene-diene rubber vulcanizate.

(Oil resistance test of ethylene-propylene-diene rubber vulcanizate)

The vulcanizate was cut to a sample of a size of 10 mm×10 mm×2 mm. The sample was dipped in an automobile engine oil (C.20 5W-40 available from British Petroleum) at a temperature of 120° C. for 24 hours, and then taken out of the engine oil to examine the change of the sample in volume before and after it was dipped. Further, three samples were placed top on the other and the change of the sample in hardness before and after it was dipped was examined. The results are shown in Tables 1 and 2.

(Preparation of RFL)

7.31 parts by weight of resorcin and 10.77 parts by weight of formalin (having a concentration of 37% by weight) were mixed together. An aqueous solution of sodium hydroxide (containing 0.33 parts by weight of sodium hydroxide) was added to the resulting mixture and stirred. Thereafter 160.91 parts by weight of water were added and the mixture was aged for 5 hours to provide an aqueous solution of resorcin-formalin resin (resorcin-formalin primary condensate, or μF resin) having a solid content of 6.40% by weight. Then, a chlorosulfonated polyethylene rubber (CSM) latex was added to the aqueous μF solution and the resulting mixture was aged for 12 hours to provide a resorcin-formalin-latex (RFL).

(Adhesion Treatment of Load Carrying Cords)

Polyester fiber cords (1500 de/2×3) were dipped in a toluene solution of polymethylene polyphenyl isocyanate (having an isocyanate solid content of 16% by weight) and heated and dried at a temperature of 250° C. for 40 seconds to effect pretreatment of polyester fiber cords.

The thus pretreated fiber load carrying cords were dipped in the RFL as mentioned above and heated and dried at a temperature of 230° C. for 40 seconds, and were then again dipped in the same RFL as the above-mentioned and heated and dried at a temperature of 230° C. for 40 seconds to effect RFL treatment of the fiber load carrying cords.

The fiber load carrying cords were then dipped in an adhesive solution prepared by dissolving the ethylene-propylene-diene rubber compound and was heated and dried at a temperature of 60° C. for 40 seconds, thereby effecting adhesion treatment of the fiber load carrying cords.

(Adhesion Treatment of Short Fibers)

Short fibers in the form of bundles of filaments were dipped in the RFL and were then taken out of the RFL so that the RFL adhered to the surface of the filaments. The short fibers were then cut to a predetermined length to provide adhesion-treated short fibers.

(Production of V-Ribbed Belt)

As mentioned hereinbefore, a sheet of rubberized canvas and a first sheet of unvulcanized ethylene-propylene-diene rubber compound to form an adhesion rubber layer were wound on the smooth surface of a molding cylinder, and then the adhesion-treated fiber load carrying cords were wound spirally thereon, and then a second sheet of unvulcanized rubber compound to form an adhesion rubber layer, the same as the first sheet, was further wound.

Then, a third sheet of unvulcanized ethylene-propylene-diene rubber compound to form a compression rubber layer was wound on the second unvulcanized rubber sheet to form a cylindrical laminate. The cylindrical laminate was then steam-vulcanized by heating at a temperature of 175° C. under an inner pressure of 6 kgf/cm$^2$ and an outer pressure of 6 kgf/cm$^2$ for 15 minutes in a vulcanization vessel to provide an annular vulcanizate product.

The annular vulcanizate product was manufactured in a manner as mentioned hereinbefore to provide a V-ribbed belt which had load carrying cords embedded in the adhesion rubber layer and had the canvas on the adhesion rubber layer and the compression rubber layer having three ribs on the lower face of the adhesion rubber layer and a length of 1000 mm.

(Abrasion Test of the Belt while it was Running)

The V-ribbed belt having three ribs and a length of 1000 mm was installed on a belt driving system comprised of a driving pulley (having a diameter of 60 mm) and a driven pulley (having a diameter of 60 mm). The V-ribbed belt was driven to run at a temperature of 25° C. for 24 hours by driving the driving pulley to rotate at 3500 rpm while an initial tension of 120 Kgf and a load of 5.2 hp were applied to the driven pulley to examine the abrasion of the belt. The results are shown in Table 1.

In Table 1, DCP stands for dicumyl peroxide, EDMA for ethyleneglycol dimethacrylate, MAAZ for zinc methacrylate, TMPTA for trimethylolpropane triacrylate, TMPTMA for trimethylolpropane trimethacrylate, TAIC for triallyl isocyanurate, DDH for 2,5-dimethyl-2,5-di(benzoylperoxyl)hexane, and the same in Tables 2 and 3.

Comparative Example 1-9

In the same manner as Examples, an ethylene-propylene-diene rubber vulcanizate was prepared using the ethylene-propylene-diene rubber compound to form a compression rubber layer mentioned hereinbefore together with the crosslinking agent and the co-crosslinking agent shown in Tables 2 and 3. The vulcanizate was subjected to the same oil resistance test as Examples. The results are shown in Tables 2 and 3.

Further, a V-ribbed belt was manufactured in the same manner as Examples using the ethylene-propylene-diene rubber compound to form an adhesion rubber layer or a compression rubber layer mentioned hereinbefore together with the crosslinking agent and the co-crosslinking agent shown in Tables 2 and 3. The V-ribbed belt was subjected to the same abrasion test as Examples. The results are shown in Tables 2 and 3.

TABLE 1

| | EXAMPLES | | | | | |
|---|---|---|---|---|---|---|
| | 1 | 2 | 3 | 4 | 5 | 6 |
| Crosslinking agent | DCP | DCP | DCP | DCP | DCP | DCP |
| Amount of crosslinking agent (mole[1)]) | 0.01 | 0.01 | 0.01 | 0.01 | 0.01 | 0.005 |
| Co-crosslinking agent | TMPTA | TAIC | TMPTMA | TMPTMA | TMPTMA | TMPTMA |
| Amount of co-crosslinking agent (parts by weight[2)]) | 2 | 2 | 2 | 0.1 | 10 | 2 |
| Short fibers A (no adhesion treatment) (parts by weight[2)]) | 15 | 15 | 15 | 15 | 15 | 15 |
| Short fibers A (with adhesion treatment) (parts by weight[2)]) | — | — | — | — | — | — |
| Oil resistance test | | | | | | |
| Increase in volume (%) | 54 | 51 | 73 | 82 | 39 | 81 |
| Change in hardness (ΔHs) | −14 | −14 | −17 | −18 | −9 | −18 |
| Abrasion (% by weight) | 0.65 | 0.63 | 0.79 | 2.04 | 0.52 | 1.97 |
| Elongation in grain direction (%) | 180 | 180 | 190 | 210 | 150 | 220 |

(Notes)
[1)]moles per 100 g of ethylene-propylene-diene rubber
[2)]parts by weight per 100 parts by weight of ethylene-propylene-diene rubber

TABLE 2

| | EXAMPLES | | COMPARATIVE EXAPLES | | | |
|---|---|---|---|---|---|---|
| | 7 | 8 | 1 | 2 | 3 | 4 |
| Crosslinking agent | DCP | DDH | Sulfur | Sulfur | DCP | DCP |
| Amount of crosslinking agent (mole[1)]) | 0.04 | 0.01 | 0.01 | 0.015 | 0.01 | 0.04 |
| Co-crosslinking agent | TMPTMA | TMPTMA | — | — | — | — |
| Amount of co-crosslinking agent (parts by weight[2)]) | 2 | 2 | — | — | — | — |
| Short fibers A (no adhesion treatment) (parts by weight[2)]) | 15 | 15 | — | — | — | — |
| Short fibers A (with adhesion treatment) (parts by weight[2)]) | — | — | 15 | 15 | 15 | 15 |
| Oil resistance test | | | | | | |
| Increase in volume (%) | 37 | 53 | 186 | 154 | 132 | 97 |
| Change in hardness (ΔHs) | −8 | −14 | −32 | −29 | −27 | −24 |
| Abrasion (% by weight) | 0.53 | 0.65 | 2.05 | 1.97 | 2.34 | 1.25 |
| Elongation in grain direction (%) | 130 | 175 | 230 | 210 | 180 | 160 |

(Notes)
[1)]moles per 100 g of ethylene-propylene-diene rubber
[2)]parts by weight per 100 parts by weight of ethylene-propylene-diene rubber

TABLE 3

| | COMPARATIVE EXAMPLES | | | | |
|---|---|---|---|---|---|
| | 5 | 6 | 7 | 8 | 9 |
| Crosslinking agent | DCP | DCP | DCP | DCP | DDH |
| Amount of crosslinking agent (mole[1)]) | 0.01 | 0.01 | 0.01 | 0.04 | 0.01 |
| Co-crosslinking agent | Sulfur | EMDA | MAAZ | TMPTMA | TMPTMA |
| Amount of co-crosslinking agent (parts by weight[2)]) | 2 | 2 | 2 | 2 | 2 |
| Short fibers A (no adhesion treatment) (parts by weight[2)]) | — | — | — | — | — |
| Short fibers A (with adhesion treatment) (parts by weight[2)]) | 15 | 15 | 15 | 15 | 15 |
| Oil resistance test | | | | | |
| Increase in volume (%) | 127 | 104 | 97 | 37 | 53 |
| Change in hardness (ΔHs) | −26 | −22 | −20 | −8 | −14 |
| Abrasion (% by weight) | 2.03 | 2.04 | 2.06 | 0.53 | 0.65 |
| Elongation in grain direction (%) | 200 | 160 | 160 | 35 | 60 |

(Notes)
[1)]moles per 100 g of ethylene-propylene-diene rubber
[2)]parts by weight per 100 parts by weight of ethylene-propylene-diene rubber As clear from the results shown in Tables 1 to 3, the vulcanizate of ethylene-propylene-diene rubber compound prepared by using an organic peroxide and a trifunctional co-crosslinking agent according to the invention was found to be swollen to a reduced degree and was also found to be suppressed in change of hardness when it was dipped in oil.

Further, the power transmission belt which had an adhesion rubber layer and a compression rubber layer and at least the compression rubber between the two rubber layers was formed of vulcanizate obtained by vulcanizing an ethylene-α-olefin-diene rubber using an organic peroxide and a trifunctional co-crosslinking agent was found to be suppressed in abrasion while it was running. In addition, when the compression rubber layer had short fibers that have not been adhesion-treated dispersed therein and oriented in the widthwise direction of the belt, the compression rubber layer had almost the same large elongation in the grain direction as the compression rubber layer formed of vulcanizate obtained by vulcanizing an ethylene-α-olefin-diene rubber using a difunctional vulcanizing agent or crosslinking agent.

In contrast, a vulcanizate of ethylene-propylene-diene rubber obtained by using sulfur as a vulcanizing agent was found to be swollen remarkably when it was stained with oil. On the other hand, a vulcanizate of ethylene-propylene-diene rubber obtained by using a relatively large amount of organic peroxide was found to be improved in oil resistance to some extent, however, the vulcanizate was not sufficient at all in oil resistance. A vulcanizate of ethylene-propylene-diene rubber obtained by using an organic peroxide and a difunctional co-crosslinking agent had no three dimensional crosslinking points so that it was found to be swollen remarkably when it was stained with oil. A V-ribbed belt which had a compression rubber layer formed of such a vulcanizate as mentioned above was found to suffer a remarkable abrasion when it was running.

The invention claimed is:

1. A power transmission belt comprising:
   (a) rubber layers comprising a compression rubber layer and an adhesion rubber layer, both of which are vulcanized and bonded to each other;
   (b) a plurality of load carrying cords embedded in the adhesion rubber layer;
   (c) short fibers dispersed in the compression rubber layer and oriented in the widthwise direction of the belt; and
   (d) a plurality of ribs formed integrally with the compression rubber layer and extending in the lengthwise direction of the belt,
   (i) wherein at least the compression rubber layer of the rubber layers comprises vulcanizate obtained by vulcanizing an ethylene-α-olefin-diene rubber with an organic peroxide in an amount of 0.005-0.05 moles in relation to 100 g of the ethylene-α-olefin-diene rubber and at least one trifunctional co-crosslinking agent selected from the group consisting of trimethylolpropane triacrylate, trimethylolpropane trimethacrylate and triallyl isocyanurate in an amount of 0.1-10 parts by weight in relation to 100 parts by weight of the ethylene-α-olefin-diene rubber, and
   (ii) wherein the compression rubber layer has the short fibers comprising first short fibers without adhesion treatment and second short fibers with adhesion treatment in an amount of 5-30 parts by weight in total in relation to 100 parts by weight of the ethylene-α-olefin-diene rubber, the second short fibers being in the amount of 5-25% by weight based on the total amount of the first and second short fibers.

2. The power transmission belt according to claim 1 wherein the adhesion rubber layer comprises vulcanizate obtained by vulcanizing an ethylene-α-olefin-diene rubber using sulfur.

3. The power transmission belt according to claim 1 wherein at least the compression rubber layer of the rubber layers comprises vulcanizate obtained by vulcanizing an ethylene-α-olefin-diene rubber with an organic peroxide in an amount of 0.01-0.04 moles in relation to 100 g of the ethylene-α-olefin-diene rubber and at least one trifunctional co-crosslinking agent selected from the group consisting of trimethylolpropane triacrylate, trimethylolpropane trimethacrylate and triallyl isocyanurate in an amount of 1-5 parts by weight in relation to 100 parts by weight of the ethylene-α-olefin-diene rubber.

\* \* \* \* \*